United States Patent
Pearce et al.

(10) Patent No.: US 6,484,308 B1
(45) Date of Patent: Nov. 19, 2002

(54) SYSTEM AND METHOD FOR ENSURING DATA INTEGRITY ON A REMOVABLE HARD DRIVE

(75) Inventors: John J. Pearce, Del Valle; Jim Walker, Cedar Park, both of TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 08/369,213

(22) Filed: Jan. 5, 1995

(51) Int. Cl.$^7$ ................................................. G06F 9/44
(52) U.S. Cl. ........................................................ 717/4
(58) Field of Search ................................ 395/700, 651, 395/653, 182.05, 470, 726, 856, 186, 828, 830, 283; 364/246.6, 246.9, 222 S, 286.6, 969, 969.3

(56) References Cited

U.S. PATENT DOCUMENTS

| | | | | |
|---|---|---|---|---|
| 4,974,151 A | * | 11/1990 | Advani et al. ............... | 364/200 |
| 5,202,997 A | * | 4/1993 | Arato ......................... | 395/725 |
| 5,237,689 A | * | 8/1993 | Behnke ....................... | 395/700 |
| 5,371,792 A | * | 12/1994 | Asai et al. ...................... | 380/3 |
| 5,386,567 A | * | 1/1995 | Lien et al. .................. | 395/700 |
| 5,430,845 A | * | 7/1995 | Rimmer et al. ............. | 395/275 |
| 5,432,938 A | * | 7/1995 | Ohashi ........................ | 395/700 |
| 5,444,642 A | * | 8/1995 | Montgomery et al. ...... | 364/550 |
| 5,479,612 A | * | 12/1995 | Kenton et al. .............. | 395/186 |

OTHER PUBLICATIONS

Shiell, J. et al, "Adding A Hard Disk To Your PC AT", Fall 1985 BYTE, Inside the IBM PCs, pp 159–164.*

Norton, P, "ROM BIOS Extensions For the IBM PC AT", Fall 1985 BYTE, Insid the IBM PCs, pp59–63.*

\* cited by examiner

*Primary Examiner*—Mark R. Powell
*Assistant Examiner*—Todd D. Ingberg
(74) *Attorney, Agent, or Firm*—Baker Botts L.L.P.

(57) ABSTRACT

A system and method for maintaining data integrity in computer systems which have removable hard drives. The system and method of the present invention ensures that a disk drive which is reinserted into the computer system is the drive used to boot the operating system. When the computer system boots, the system reads the unique drive identification information from the hard drive and stores this identification information in memory for later use. Later, the computer system may be powered down or placed in a suspend state where the hard drive may be removed and a new drive inserted. When the computer system resumes and first requires access to the hard drive, the system and reads the drive identification information from the drive and compares the drive identification obtained from the drive with the drive identification information stored in memory at boot time. If the two sets of identification information are identical, then control is returned to the native operating system and access is allowed to the drive. In this case, since the two sets of drive identification information are identical, the same drive is comprised in or has been reinserted in the computer system, and thus operation can proceed. If the two sets of drive identification are not identical, then the system powers off the drive and reports to the user that the drive installed in the computer system is not the expected drive, i.e., is not the drive used to boot the system.

21 Claims, 2 Drawing Sheets

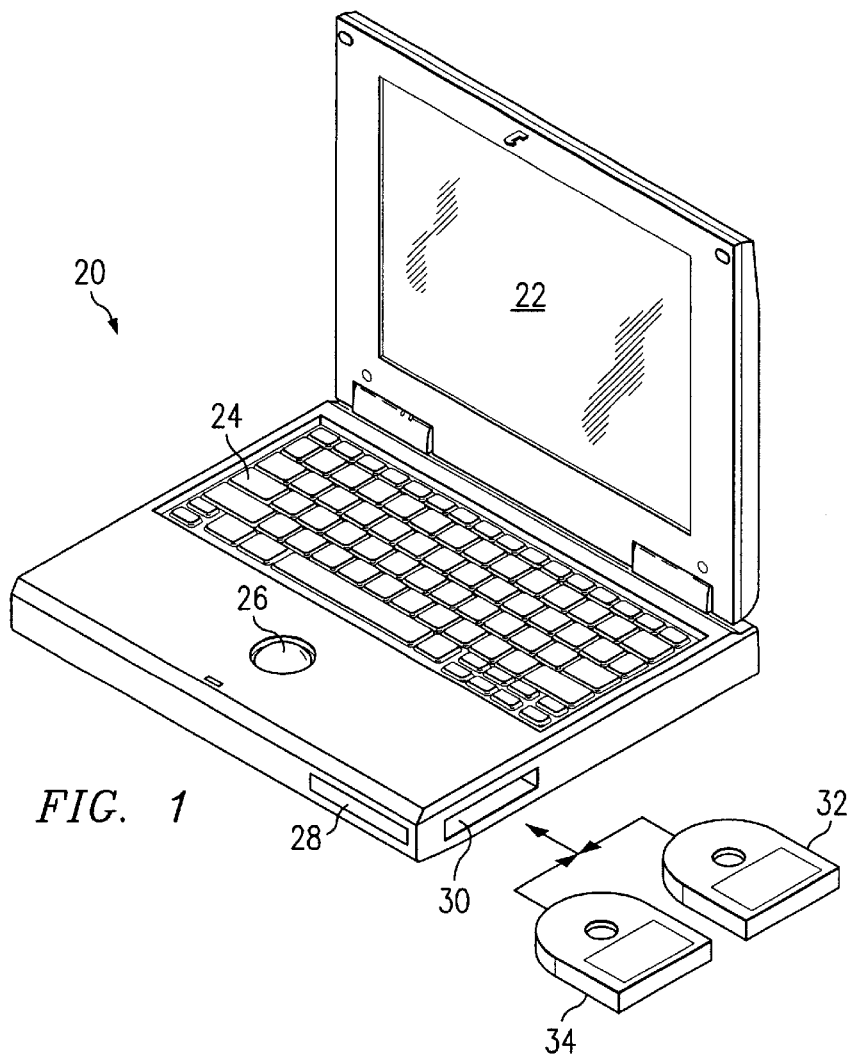
FIG. 1
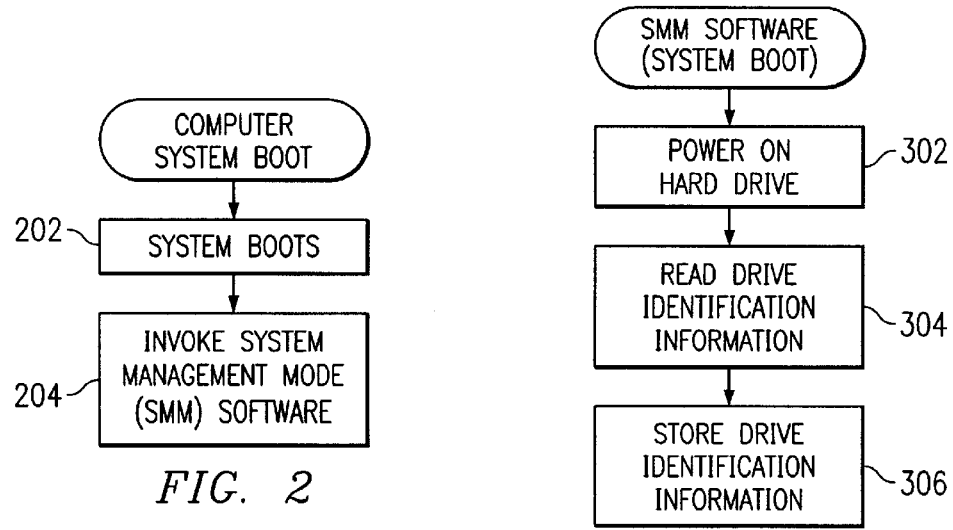
FIG. 2
FIG. 3 ent invention relates to computer systems having
SYSTEM AND METHOD FOR ENSURING DATA INTEGRITY ON A REMOVABLE HARD DRIVE

FIELD OF THE INVENTION

The present invention relates to computer systems having removable hard drives, and more particularly to a system and method for preventing an operating system from accessing a hard drive which is different than the hard drive used to boot the system.

DESCRIPTION OF THE RELATED ART

It is sometimes desirable for two or more users to be able to share a single computer system. One feature that facilitates the sharing of a computer system is a removable hard drive. A computer system with a removable hard drive allows a plurality of users to each have a separate hard drive with the respective user's applications and data. In this manner, multiple users each having their own drives can effectively share a single computer system. A removable hard drive also allows a single user to store a greater number of applications and data for use in the computer system than would otherwise be available with a single non-removable hard drive. For example, the user can maintain two or more hard drives which each contain desired applications, and the user can insert the respective hard drive into the computer system depending upon the desired application or data desired to be accessed.

In computer systems with a removable hard drive, the computer system can be booted with a respective hard drive, and the hard drive can typically be removed and then later reinserted while the operating system is still active. With some operating systems, the hard drive used to boot the computer system can be removed and a new drive reinserted while the operating system is still active. However, in other operating systems, such as the DOS and Windows operating systems, the primary boot drive cannot be replaced with a new drive while the operating system is still active. In other words, the DOS and Windows operating systems have limited mechanisms for having their primary boot drive replaced while they are active. In general, if the primary hard drive is changed to a different drive while these operating systems are active, these operating systems typically write invalid data to the new drive, resulting in probable erroneous operation.

Some operating systems include the ability to read and verify that a new drive placed in the computer system while the operating system is still active is not a different drive than the one used to boot the system. For example, the operating systems R2 X2 and R-DOS read and verify the user changeable volume ID which is recorded on the hard drive. However, this method is flawed because a computer user can assign the same volume ID to multiple different drives. Thus, if the primary boot drive having a first volume ID was removed and a second different hard drive with the same volume ID was inserted into the computer system, the operating system would erroneously conclude that the same drive was reinserted and would write data to the drive accordingly, resulting in probable erroneous operation. Other operating systems such as UNIX include a mount and unmount mechanism to ensure that the boot drive is the drive reinserted into the computer system. However, this mechanism requires human interaction and is therefore subject to failure.

Therefore, an improved system and method is desired for ensuring that a drive that is inserted into the computer system is the hard drive used to boot the computer system and thus is the drive expected by the operating system.

SUMMARY OF THE INVENTION

The present invention comprises a system and method for maintaining data integrity in computer systems which have removable hard drives. The system and method of the present invention ensures that a disk drive which is inserted into the computer system while the operating system is active is the drive used to boot the operating system. The present invention can be used for removable hard drives of various types, including removable PCMCIA drives.

When the computer system boots, system management mode (SMM) software is invoked which powers on the hard drive and reads unique drive identification information from the hard drive. In the preferred embodiment, IDE (Integrated Drive Electronics) drives are used, and these drives include drive identification information which comprises a unique manufacture identification and a drive serial number. This information is read and stored in memory for later use. Later, portions of the computer system may be powered down or the system may be placed in a suspend state. This can occur either under user control or through power management software operating in the computer system. When the hard drive is powered down and/or the computer system is in a suspend state, the hard drive can be removed and later reinserted.

When the computer system resumes from a power down or suspend state and first requires access to the hard drive, the system management mode (SMM) software is again invoked, preferably through I/O port trapping. The SMM software powers on the hard drive and reads the drive identification information from the drive. The SMM software then compares the drive identification obtained from the drive with the drive identification information stored in memory at boot time. If the two sets of identification information are identical, then the SMM software returns control to the native operating system and allows access to the drive. In this case, since the drive identification information obtained after the computer system resumes is identical to the drive identification information saved at boot time, the same drive is comprised in or has been reinserted in the computer system, and thus operation can proceed. If the two sets of drive identification are not identical, then the SMM software powers off the drive and reports to the user that the drive installed in the computer system is not the expected drive, i.e., is not the drive used to boot the system. The SMM software then waits for confirmation that the drive has been changed. When a new drive is inserted, the SMM software repeats the above steps of powering on the hard drive, reading the obtained drive information and comparing the drive identification with the drive identification information stored at boot time. This operation repeats until the correct drive, i.e., the drive used to boot the system, is inserted into the computer system.

Therefore, the invention comprises a system and method for ensuring that a drive different than the hard drive used to boot the system is not inserted into the system while the system is running. The system and method of the present invention thus ensures data integrity in computer systems having removable hard drives. The present invention is also independent of operating system and thus can be used in varying platforms.

BRIEF DESCRIPTION OF THE DRAWINGS

A better understanding of the present invention can be obtained when the following detailed description of the preferred embodiment is considered in conjunction with the following drawings, in which:

FIG. 1 illustrates a computer system including a removable hard drive configuration;

FIG. 2 is a flowchart diagram illustrating operation of the computer system during system boot;

FIG. 3 is a flowchart diagram illustrating operation of system management mode (SMM) software according to the present invention during system boot;

DETAILED DESCRIPTION OF THE PREFERRED EMBODIMENT

Figure 4:
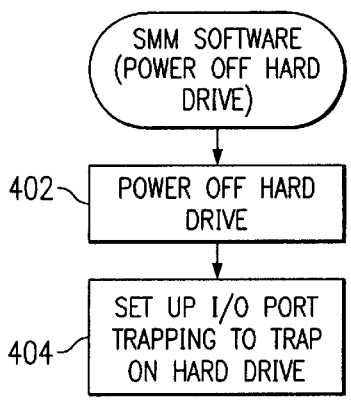
FIG. 4 is a flowchart diagram illustrating operation of the SMM software when the computer system enters a reduced power state.

Referring now to FIG. 1, a portable computer system which can receive one of a plurality of removable hard drives and incorporating the system and method of the present invention is shown. The system and method of the present invention can be incorporated into various types of computer systems which include removable hard drive configurations, including the portable system shown in FIG. 1, desk top units, mini-tower units, as well as others. As shown, the computer system 20 includes a display screen 22, keyboard 24, mouse 26, and floppy drive 28. The computer system includes components generally found in all computer systems, including a CPU, system memory, one or more buses, and various peripheral controllers and devices, and a ROM or Flash memory storing BIOS (Basic Input/Output Services) software, among others.

The computer system 20 also includes a hard drive slot 30 for receiving a removable hard drive, whereby either of hard drives 32 and 34, among others, can be inserted into the hard drive slot 30 to operate with the computer system 20. Thus, hard drive 32 can be inserted into the hard drive slot 30 and the computer system 20 can be booted and operated using the applications and operating system stored on the hard drive 32. The hard drive 32 may then be removed, optionally with the computer system on and the operating system active, and either the same hard drive 32 or new hard drive 34 can be inserted into the hard drive slot 30. The computer 20 may then be operated using the operating system and applications stored on the new hard drive in the system, either hard drive 32 or hard drive 34. Therefore, this removable hard drive configuration allows multiple users each having a respective hard drive to share a single computer system 20. This configuration also allows a single user to effectively increase the hard drive capacity of his computer system through multiple removable hard drives 32 and 34.

The hard drives 32 and 34 are preferably integrated drive electronics (IDE) drives. Each IDE drive comprises unique drive identification information including a unique manufacturer identification number and a drive serial number. This unique identification information is used according to the present invention to ensure that a drive different than the drive used to boot the computer system is not inserted into the computer system. It is noted that other types of drives which include unique drive identification information may be used, as desired.

The computer system 20 is preferably configured with either or both of the DOS and Windows operating systems. As discussed in the background section, both the DOS and Windows operating systems have limited mechanisms for having their primary or boot hard drive replaced while the operating systems are active. In other words, if a first hard drive was used to boot the computer system, and while the operating system was still active, the first hard drive was removed and a new hard drive was inserted into the computer system, the operating system would write invalid data to the new drive, resulting in probable erroneous operation. The present invention comprises a system and method which ensures that the drive inserted or used in the computer system is the drive used to boot the computer system. This prevents the problem of the operating system inadvertently writing invalid data to the new drive and thus prevents erroneous operation. It is noted that other operating systems may be used in the computer system, preferably ones which also have limited mechanisms for having their boot hard drive replaced while the operating system is still active.

In the preferred embodiment of the invention, the computer system includes system management mode (SMM) software which performs power management functions under user control or system control. The SMM software is preferably incorporated in the computer system BIOS. The hard drive being used in slot 30 can be removed preferably only while the computer system is in a suspend or reduced power state or the hard drive has been powered down. However, even though the computer system is in a suspend state or the hard drive is powered down, the operating system is still active. Therefore, the system and method of the present invention ensures that the drive which is used in the computer system 20 after the computer system resumes operation from either of the above states is the drive which the operating system expects, i.e., is the drive that was initially used to boot the computer system.

Referring now to FIG. 2, a flow chart diagram illustrating operation of the computer system during its boot process is shown. As shown, in step 202 the computer system boots. Here the computer system performs a Power On Self Test (POST) as well as other operations, as is well known in the art. In step 204 the computer system invokes the system management mode (SMM) software according to the present invention.

Referring now to FIG. 3, operation of the system management mode (SMM) software during system boot is shown. In step 302, the SMM software powers on the hard drive inserted into the hard drive slot 30. For example, if the hard drive 32 is inserted into the hard drive slot 30, then the SMM software powers on the hard drive 32. In step 304 the SMM software reads the drive identification information on the hard drive 32 in the hard drive slot 30. As noted above, the hard drive 32 is preferably an IDE drive, and the hard drive identification information comprises a unique manufacturer identification number and a drive serial number. In step 306 the SMM software stores the drive identification information at a designated spot in system memory.

At a later point in time, the computer system may be placed in a suspend state and/or the hard drive may be powered down. This can occur either through user operation or automatic power saving features. During either the suspend state or power down of the hard drive, a user can remove the hard drive 32 and reinsert the hard drive 32 at a later time. The user may also insert a new drive 34 into the hard drive slot 30 of the computer system. As discussed previously and in the background section, certain operating systems, including the DOS and Windows operating systems, have limited mechanisms for having their primary or boot drive replaced while the operating systems are active. If a new hard drive is placed in the computer system while the operating system is active, these operating systems write invalid data to the new drive, resulting in probable erroneous operation.

Referring now to FIG. 4, when a period of inactivity has elapsed and/or the user manually opts to power down the system, an SMI interrupt is generated which invokes the SMM software. In step 402 the SMM software powers off the hard drive. In step 404 the SMM software sets up I/O port trapping to trap on the next access to the hard drive when the system is resumed. As discussed below, when the system resumes, the I/O port trapping invokes the SMM software, which then performs a determination as to whether the hard drive inserted in the system when the system resumes is the same hard drive that was used to boot the system.

Figure 5:
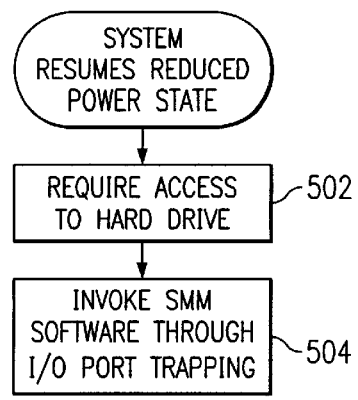
FIG. 5 is a flowchart diagram illustrating operation of the computer system resuming from a reduced power state.

After the computer system operation has been suspended and/or the hard drive has been powered down, a number of events can cause the system to resume operation. FIG. 5 illustrates operation of the system when the computer system resumes. When the computer system first requires access to the hard drive in step 502, then in step 504 the computer system invokes the SMM software. The SMM software is preferably invoked through I/O port trapping as discussed above, which was enabled by the SMM software in step 404 of FIG. 4. However, it is noted that other methods may be used to invoke the SMM software after the system resumes and requires access to the hard drive.

Figure 6:
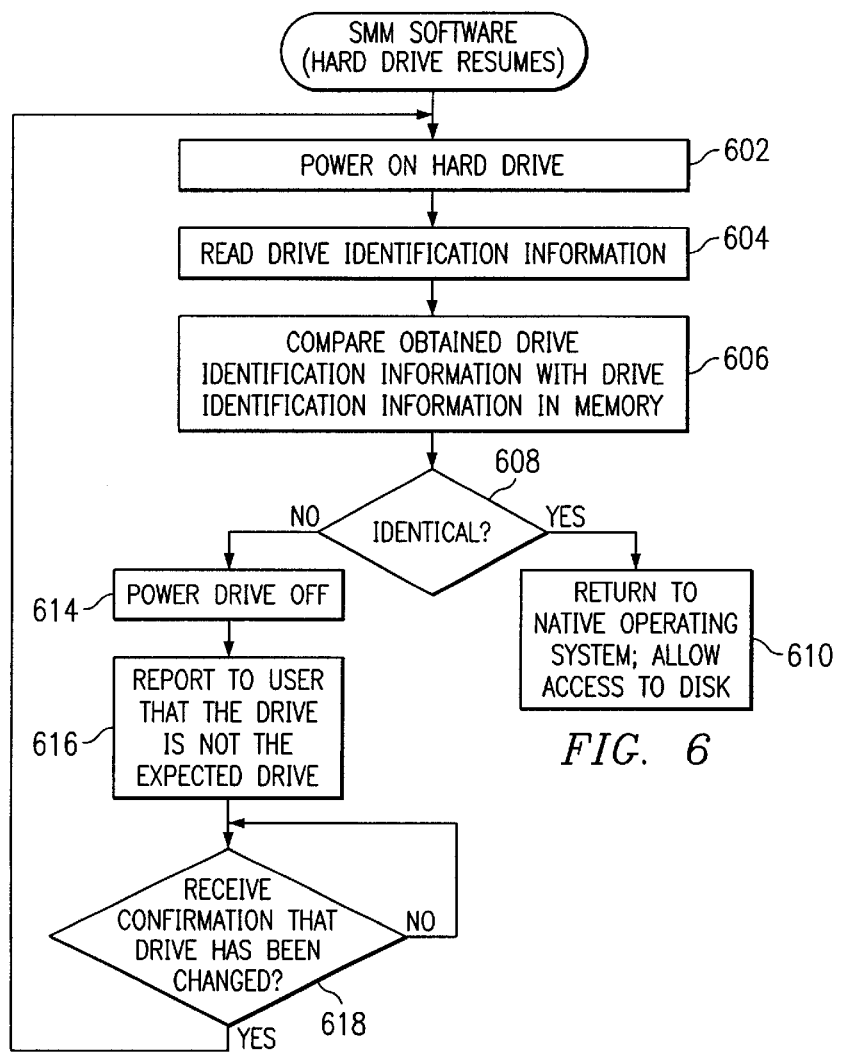
FIG. 6 is a flowchart diagram illustrating operation of the SMM software of the present invention ensuring that the hard drive in the resumed computer system is the same hard drive used to boot the system at power up.

Referring now to FIG. 6, the operation of the SMM software module when the computer system resumes operation is shown. In step 602 the SMM software powers on the hard drive in the computer system 20. In step 604 the SMM software reads the drive identification information from the hard drive. In step 606 the SMM software compares the drive identification information received from the drive currently in the computer system with the drive identification information stored by the SMM software in system memory during boot in step 306 of FIG. 3. In step 608 the SMM software determines if the two sets of drive identification information are identical. If the two sets of drive identification information are determined to be identical in step 608, then in step 610 the SMM software returns control of the computer system to the native operating system, i.e., either Windows or DOS, and allows access to the disk drive. In this instance, the hard drive currently installed in the computer system after the computer system has resumed from a suspend or power down state is the same drive that was used to boot the system, and thus the drive inserted into the slot 30 is the hard drive expected by the operating system.

If the two sets of drive identification information are determined to not be identical in step 608, then in step 614 the SMM software powers the drive off and in step 616 reports to the user that the drive is not the expected drive. The SMM software reports to the user that the drive is not the expected drive, preferably by placing a message on the screen stating that the current drive in the computer system 120 is not the expected drive, i.e., is not the drive that was initially used to boot the computer system. In step 618 the SMM software waits to receive an indication that the hard drive has been changed. This indication preferably comprises input from the user. The SMM software remains in step 618 until confirmation has been received that the hard drive has been changed. When this confirmation is received, the software returns to step 602 and repeats steps 602–618. This process repeats until the correct hard drive has been placed in the computer system.

Therefore, a system and method for ensuring data integrity in a computer system that has a removable hard drive is shown. If a first hard drive is used to boot the computer system and, while the operating system is still active, a second different hard drive is inserted into the hard drive slot of the system, certain operating systems will write invalid data to the drive. The present invention ensures that the computer system can resume operation only if the hard drive that was used to boot the system is the one being used in the system.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for maintaining data integrity on a hard drive in a computer system which can receive one or more removable hard drives, each of the hard drives identified by unique drive identification information, comprising the steps of:

booting the computer system to begin computer system operation, wherein said step of booting uses a first removable hard drive comprised in the computer system;

reading first drive identification information from the first removable hard drive in the computer system;

storing said first drive identification information in a memory;

the computer system entering a first state, wherein said first removable hard drive may be removed and a different hard drive may be inserted while the computer system is in said first state;

reading second drive identification information from the hard drive in the computer system after said step of entering said first state;

comparing said second drive identification information from the hard drive in the computer system with said first drive identification information; and preventing access to the hard drive in the computer system if said first drive identification information does not match said second drive identification information in said step of comparing.

2. The method of claim 1, further comprising:

allowing access to the hard drive in the computer system if said first drive identification information matches said second drive identification information in said step of comparing.

3. The method of claim 1, wherein said step of preventing access to the hard drive comprises powering off said hard drive.

4. The method of claim 1, further comprising indicating to the user that the hard drive is not the correct drive after said step of comparing if said first drive identification information does not match said second drive identification information in said step of comparing.

5. The method of claim 4, further comprising:

receiving an indication that the hard drive has been changed after said step of indicating to the user that the drive is not the expected drive; and repeating said steps of reading said second drive identification information and comparing said first drive identification information and said second drive identification information after said step of receiving an indication that the drive has been changed.

6. The method of claim 1, wherein said first state is a reduced power state, the method further comprising:

the computer system resuming operations after entering said first state;

the computer system requiring access to the hard drive in the computer system after said step of resuming operation and prior to said steps of reading said second drive identification information and comparing said second drive identification information with said first drive identification information.

7. The method of claim 6, wherein said step of reading said second drive identification information and said step of comparing are performed in response to said step of requiring access to the hard drive.

8. The method of claim 1, wherein said first removable hard drive is an Integrated Drive Electronics (IDE) drive.

9. The method of claim 1, wherein said first and second drive identification information each comprises a manufacturer identification number and a drive serial number.

10. The method of claim 1, further comprising:

the user removing said first removable hard drive from the computer system after said step of entering said first state;

the user reinserting said first removable hard drive in the computer system prior to said step of reading second drive identification information, wherein said step of comparing indicates that said second drive identification information matches said first drive identification information; and allowing access to the hard drive in the computer system after said step of comparing.

11. The method of claim 1, further comprising:

the user removing said first removable hard drive from the computer system after said step of entering said first state; and the user inserting a second hard drive in the computer system prior to said step reading second drive identification information, wherein said step of comparing indicates that said second drive identification information does not match said first drive identification information; and preventing access to said second hard drive in the computer system after said step of comparing.

12. The method of claim 11, wherein said step of booting includes an operating system beginning execution on the computer system;

wherein said operating system is active during said steps of removing said first removable hard drive and inserting said second hard drive.

13. A method for determining if a disk drive in a computer system is the drive used to boot the computer system, comprising the steps of:

booting the computer system to begin computer system operation, wherein said step of booting uses a first removable hard drive comprised in the computer system;

reading first drive identification information from the first removable hard drive in the computer system, said first drive identification information uniquely identifying the first removable hard drive;

storing said first drive identification information in a memory;

the computer system entering a first state, wherein said first removable hard drive may be removed and a different hard drive may be inserted while the computer system is in said first state;

reading second drive identification information from the hard drive in the computer system after said step of entering said first state;

comparing said second drive identification information from the hard drive in the computer system with said first drive identification information to determine if the disk drive in the computer system is the first removable hard drive.

14. The method of claim 13, further comprising:

preventing access to the hard drive in the computer system if said first drive identification information does not match said second drive identification information in said step of comparing.

15. The method of claim 13, further comprising:

allowing access to the hard drive in the computer system if said first drive identification information matches said second drive identification information in said step of comparing.

16. The method of claim 13, further comprising indicating to the user that the hard drive is not the correct drive after said step of comparing if said first drive identification information does not match said second drive identification information in said step of comparing.

17. The method of claim 16, further comprising:

receiving an indication that the hard drive has been changed after said step of indicating to the user that the drive is not the expected drive; and repeating said steps of reading said second drive identification information and comparing said first drive identification information and said second drive identification information after said step of receiving an indication that the drive has been changed.

18. The method of claim 13, wherein said first state is a reduced power state, the method further comprising:

the computer system resuming operations after entering said first state;

the computer system requiring access to the hard drive in the computer system after said step of resuming operation and prior to said steps of reading said second drive identification information and comparing said second drive identification information with said first drive identification information, wherein said step of reading said second drive identification information and said step of comparing are performed in response to said step of requiring access to the hard drive.

19. The method of claim 13, further comprising:

the user removing said first removable hard drive from the computer system after said step of entering said first state; and the user inserting a second hard drive in the computer system prior to said step reading second drive identification information, wherein said step of comparing indicates that said second drive identification information does not match said first drive identification information; and preventing access to said second hard drive in the computer system after said step of comparing.

20. The method of claim 19, wherein said step of booting includes an operating system beginning execution on the computer system;

wherein said operating system is active during said steps of removing said first removable hard drive and inserting said second hard drive.

21. The method of claim 13, wherein said first removable hard drive is an Integrated Drive Electronics (IDE) drive.

* * * * *